United States Patent [19]
Fichter et al.

[11] 4,008,732
[45] Feb. 22, 1977

[54] DIVERTER VALVE

[75] Inventors: Barry S. Fichter, Louisville, Ky.; Lane Scot Duncan, Lakewood, Ohio

[73] Assignee: American Standard, Inc., New York, N.Y.

[22] Filed: Sept. 23, 1975

[21] Appl. No.: 615,946

[52] U.S. Cl. .............................. 137/119; 137/218
[51] Int. Cl.² ................ F16K 11/06; F16K 31/383
[58] Field of Search .................. 137/119, 467, 218

[56] References Cited
UNITED STATES PATENTS

| | | | |
|---|---|---|---|
| 2,939,474 | 6/1960 | De Simone et al. | 137/119 |
| 3,232,307 | 2/1966 | Bucknell et al. | 137/119 |
| 3,336,935 | 8/1967 | Ward et al. | 137/119 |
| 3,376,884 | 4/1968 | Bucknell et al. | 137/119 |
| 3,433,264 | 3/1969 | Parkison | 137/625.17 |
| 3,459,207 | 8/1969 | Bacheller | 137/119 |
| 3,754,709 | 8/1973 | Laatsch | 137/218 X |
| 3,895,643 | 7/1975 | Ward | 137/119 |

*Primary Examiner*—William R. Cline
*Attorney, Agent, or Firm*—James J. Salerno, Jr.; Robert G. Crooks

[57] ABSTRACT

A diverter valve assembly arranged and constructed to be coupled in fluid communication between fluid inlet and a pair of outlet openings for normally conducting fluid through one outlet until the other outlet is opened, to automatically divert the fluid to the other outlet. The assembly comprises a housing having first and second spaced chambers. A conduit interconnects the first and second chambers and is provided with at least one port for conducting fluid from the first chamber to the one outlet. A tubular member is positioned in the conduit and is adapted to reciprocate therein when the other outlet is opened and closed. Means is coupled to the tubular member and positioned within the first chamber to provide a fluid tight seal when the other outlet is opened, and to prevent flow of fluid through the one outlet. Piston means is disposed in the second chamber and is coupled to the other end of the tubular member, so that when the other outlet is opened and closed, the tubular member is reciprocated by the change in fluid pressure. Also valve means may be associated with the seal means and the tubular member to prevent a backflow of fluid to the inlet opening when reduced pressure occurs within the first chamber.

16 Claims, 7 Drawing Figures

DIVERTER VALVE

BACKGROUND OF THE INVENTION

This invention relates to an improved diverter valve, and more particularly to a diverter valve assembly which is substantially anticlogging, has an improved antisiphon valve means and automatically diverts fluid flow without chatter from an inlet source to either of a pair of outlets in response to the opening of one of the outlets.

Diverter valves of various types and construction are employed in either tub or shower valve assemblies or in kitchen mixing faucets such as is described in U.S. Pat. No. 3,376,884. While diverter valves of this type function satisfactorily, however, they tend to stick or clog either in the spray mode or spout mode position or leak through the spout when spraying, or cause chattering when changing from the spout mode to the spray mode position, and flow volume may vary when the mixing valve is set at constant operating conditions for either hot or cold water flow. Also many of the plumbing codes require that a diverter valve also include an antisiphon valve. This is to prevent backflow of used water through the fitting and into the potable system in the event of a reduced pressure occuring within the system.

SUMMARY OF THE INVENTION

This invention generally contemplates providing a diverter valve assembly which is arranged and constructed to be coupled in fluid communication between the fluid inlet and a pair of outlet openings for normally conducting fluid through one outlet until the other outlet is opened. When the other outlet is opened the diverter valve automatically shifts the flow of fluid from the one outlet to the other outlet. The diverter valve assembly comprises a housing having first and second spaced chambers. Interconnecting the spaced chambers is a conduit having at least one port for conducting fluid from the first chamber to the one outlet. A tubular member is positioned in the conduit and is adapted to reciprocate therein when the other outlet is opened and closed. Coupled to the tubular member and positioned within the first chamber is means to provide a fluid tight seal when the other outlet is opened, and also to prevent flow of fluid through the one outlet. Piston means is disposed in the second chamber and is coupled to the other end of the tubular member so that when the other outlet is opened and closed, the tubular member is automatically reciprocated by the change in fluid pressure to divert the fluid flow from the one outlet to the other outlet.

Valve means may be associated with the seal means and the tubular member to prevent backflow of fluid to the inlet opening when reduced pressure occurs within the first chamber.

It is an object of the invention to provide a diverter valve in which sufficient clearance is maintained by the moving parts whereby clogging and chattering is substantially eliminated.

It is another object of the invention to provide a diverter valve assembly in which substantially all of the parts are made of moldable plastic and elastomeric materials.

It is another object of the invention to provide a diverter valve assembly having an improved antisiphon valve means and auxiliary antisiphon valve means.

Still another object of the invention is to provide a diverter valve assembly adapted for use in mixing faucets which has relatively few parts, simple to manufacture, easy to assemble and is of inexpensive construction.

A better understanding of the invention will be had from a detailed description of the drawings illustrating the general principles of the invention. It should be understood that the drawings are merely illustrative of the invention although many variations and changes in design and materials may be had without departing from the invention.

DETAILED DESCRIPTION OF THE INVENTION

Figure 1:
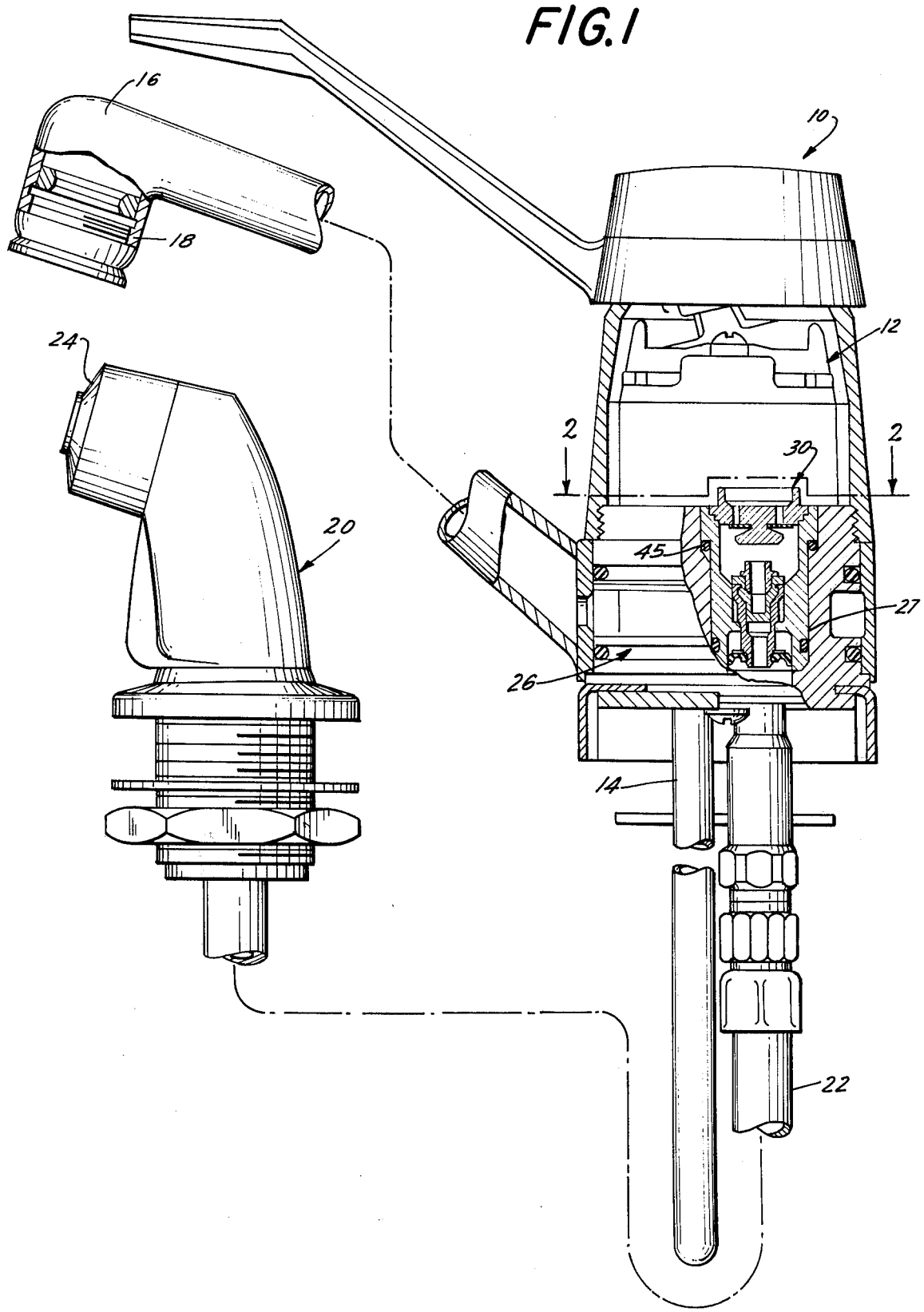
FIG. 1 illustrates a mixing faucet assembly partly in vertical section showing the diverter valve assembly mounted in the body of the mixing valve.
Figure 2:
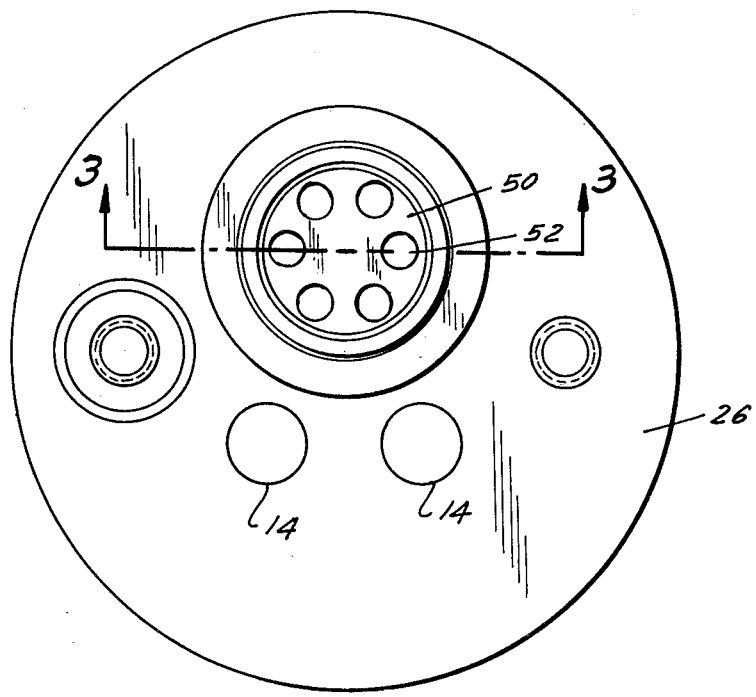
FIG. 2 is a sectional view taken along the line 2—2 of FIG. 1.

The attached drawings generally represent an arrangement for connecting a diverter valve to a flow control valve normally controlling the flow of water to a faucet arrangement so that the diverter valve may either transfer the flow of water through the spout of the faucet or through the spray head assembly.

The mixing valve 10 includes a cartridge 12 which controls the flow of water from an input conduit 14 through a spout 16 to be discharged through the spout end 18, and upon manipulation of a spray head assembly 20, the incoming water will be caused to flow through a diverter conduit 22 to a diverter spout end 24.

The cartridge 12 encloses a disc valve mechanism of the type shown and described in U.S. Pat. No. 3,433,264. The cartridge 12 is removably mounted upon a manifold 26 in which diverter valve assembly 30 is mounted in fluid communication between inlet conduit 14 and a pair of outlets, spout end 18 and spray head assembly 20.

Figure 3:
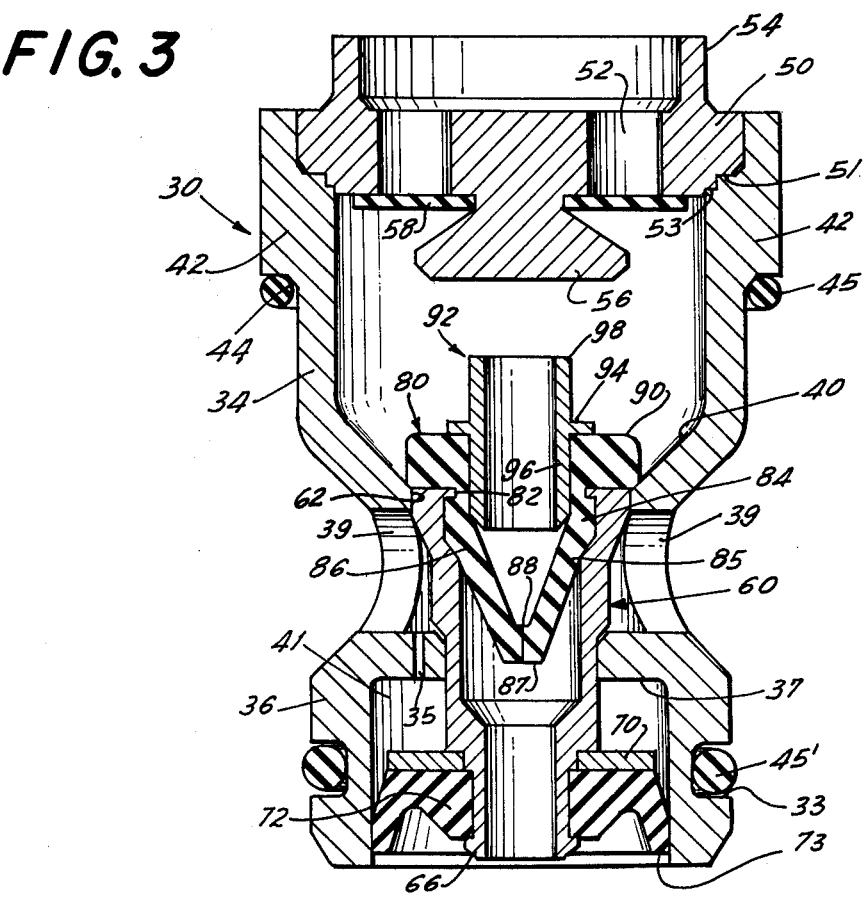
FIG. 3 is an elevational sectional view taken aling line 3—3 of FIG. 2.
Figure 3B:
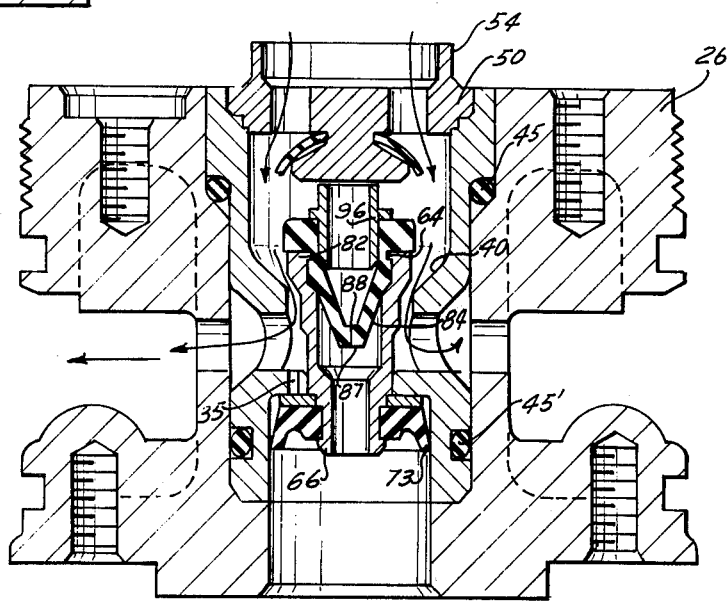
Figure 4:
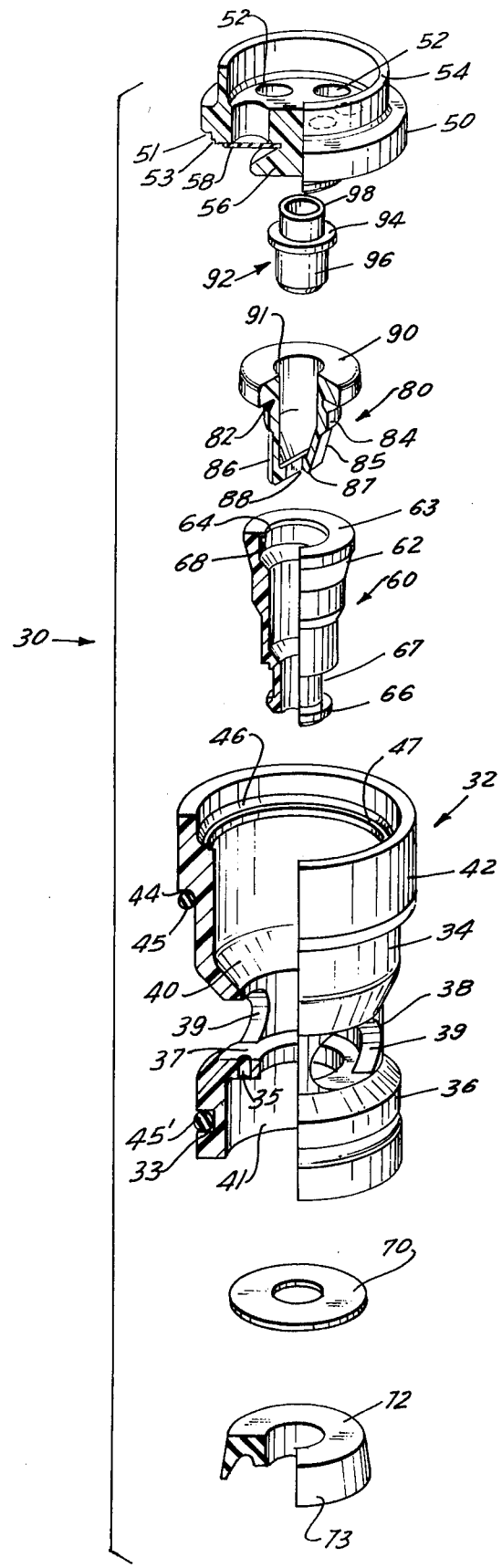
FIG. 4 is an isometric view partly in section illustrating the parts and assembly of the diverter valve.

As shown most clearly in FIG. 4 diverter valve assembly 30 includes a housing 32 having spaced first and second chambers 34 and 36 respectively. Conduit 38 interconnects chambers 34 and 36 and is provided with ports 39 through which water is conducted to spout end 18 when diverter valve assembly is in the spout mode position as shown in FIG. 3b. Housing 32 is preferably molded from a suitable plastic material such as an acetal resin sold under the tradenames of Celcon or Delrin, or a polysulfone resin or a resin made from a mixture of polystyrene and polyphenylene oxide sold under the tradename Noryl.

First chamber 34 is generally cup-shaped, open at both ends and has a tapered surface or wall 40 which terminates with one end of conduit 38. The open outer end of cup 34 has an outer rim 42 which forms a step or ledge 44 and retains O-ring 45 to provide a water tight seal with manifold 26 as shown in FIG. 1. Inner steps or ledges 46 and 47 provide a seat for top plate 50 to nest within rim 42 as shown in FIGS. 1 and 3. Plate 50 is perforated and has a plurality of openings 52 which serve as entrant openings for the flow of water into the diverter valve assembly 30. An upstanding rim or collar surrounds opening 54 and serves as a gripping area to facilitate removal of the diverter from the manifold 26. Retaining ring 56 is formed centrally on the underside of plate 50 for removably mounting check valve washer 58. Check valve 58 is made of a thin elastomeric such as rubber, which may be either natural or synthetic and functions as an auxiliary antisiphon check valve. Plate 50 is formed having complimentary steps 51 and 53 which nest in steps 46 and 47 of chamber 34. Steps 51, 53, 46 and 47 are so formed that they melt and fuse together to form a leak-proof seal when a source of ultrasonic energy is applied to part 50 as by ultrasonic welding.

Tubular member 60 is mounted for reciprocation within conduit 38 and provides a conduit for fluid communication with diverter conduit 22 and chamber 34. As shown in FIG. 3 the upper section 62 of tubular member 60 has a tapered wall 61 which nests against tapered wall 40 of first chamber 34 so that it centers member 60 within the first chamber 34. The upper surface of tubular member 60 has an inwardly extending rim 64 so as to form a lip. The lower section of tubular member 60 is of reduced diameter and has an outwardly extending retaining rim 66 thereby forming groove or slot 67 for retaining piston washer and resilient piston 72 as shown most clearly in FIG. 3.

Second chamber 36 is also generally cup-shaped and is open at both ends and has a wall 37 extending radially inwardly which terminates with the other end of conduit 38. Cup or chamber 36 serves as the cylinder having a piston wall 41 so that when piston 72 is mounted on tubular member 60, as shown in FIG. 3, the respective wall surfaces of the cylinder and piston form a liquid tight seal. Chamber 36 has a circumferential groove 33 formed in its outer surface for mounting an O-ring which provides a water tight seal as shown in FIGS. 1 and 3. Bleed hole 35 is formed in wall 37 to facilitate removal of any liquid which may collect between washer 70 and wall 37. One or more bleed holes may be necessary to expell the liquid quickly so as to eliminate any chattering that may occur.

Elastomeric member 80 is arranged and constructed to be coupled to tubular member 60, is of unitary design and preferably made of rubber, either natural or synthetic. Retaining lip or rim 64 of tubular member 60 nests within complementary groove 82 of elastomeric member 80 to removably mount the elastomeric member on tubular member 60.

Figure 3A:
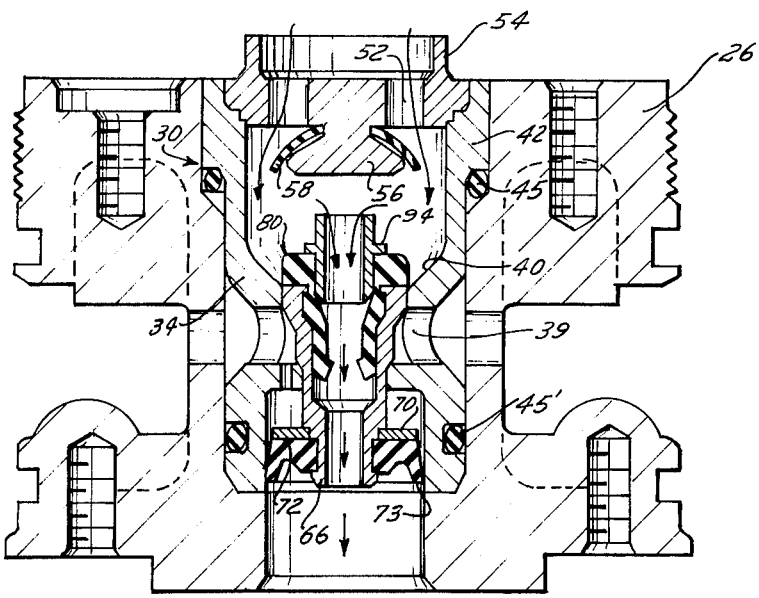
FIGS. 3a, 3b and 3c illustrate the operation of the diverter valve assembly when in the spay mode, spout mode or backflow prevention mode respectively.

Elastomeric member 80 comprises an upper section or seal means 90 which overlies end surface 63 of tubular member 60 and extends radially outwardly to form a rim so that the rim contacts tapered wall surface 40 of cup 34 and is capable of forming a fluid tight seal when diverter valve assembly 30 is in the spray mode position, as shown in FIG. 3a.

Lower section 84 of elastomeric member 80 functions as a one way valve and has a shape commonly referred to as a duck bill. Lower section of duck bill valve 84 includes tapered walls 85 and 86 in which the lower outer ends 87 of walls 85 and 86 touch to form slit opening 88. When diverter valve assembly 30 is in the spray mode position and in which seal means 90 makes fluid tight seal with wall 40 of cup 34, fluid is conducted through duck bill valve 84 thereby opening slit 88 to permit fluid to flow through spray end 24.

When flow ceases the water pressure is no longer exerted against elastomeric walls 85 and 86 thereby automatically closing slit opening 88. In the event that a reduced pressure should occur within cup 34 water would be prevented from flowing back through one way valve 84 thereby providing an effective antisiphon valve means. Also in the event that duck bill valve 84 should fail by remaining open, auxiliary antisiphon check valve 58 will prevent water from passing into inlet conduit 14 thereby preventing any contamination of the potable water supply.

A further function of valve 84 is to block the flow of liquid from portions of chamber 36 below piston 72 when the pressure in chamber 34 is reduced, so that the reduced pressure in chamber 34 will cause member 60 to rise, lifting seal means 90 from its seat on tapered wall 40, thus allowing air in spout 18. The air will then nullify the vacuum existing in chamber 34. Without valve 84, the reduced pressure in chamber 34 would be communicated to the lower part of chamber 36 and since the area of piston 72 is greater than seal 90, the pressure forces will keep the tubular member 60 in the down position thereby sealing off the spout. Thus a requirement contained in certain plumbing codes that the vacuum be "broken" by admitting air through the spout is achieved by the present design.

Retainer 92 is a tube made either of brass or thermoplastic material and has a flange 94 extending radially outwardly between its ends. Lower section 96 has a diameter slightly larger than the diameter of the opening 91 of elastomeric member 80 so that when inserted therein member 80 is firmly held in a compressive fit in tubular member 60 and will not dislodge when water pressures even when elevated, are subjected against valve 84 of member 80. The upper section 98 of the retainer is of a length such that it never touches the surface of retaining ring 56 of plate 50 when diverter valve assembly 30 is in the spout mode position shown most clearly in FIG. 3b. Retainer 92 serves a further function of increasing the spray flow at high pressures. When the supply pressure is high, then high pressure results in chamber 34. When spray valve 20 is opened the pressure is reduced in chamber 36, but the differential pressure between chamber 34 and 36 is concentrated mainly in chamber 36 as the flow enters opening 91 of elastomeric member 80. The pressure drop acts to squeeze opening 91 closed when retainer 92 is absent which results in poor spray at these pressures. Retainer 92 is rigid enough to withstand the pressure while maintaining sufficient flow of fluid through spray 20.

To assemble diverter valve 30, reference is had to FIG. 4. Elastomeric member 80 and retainer 92 are mounted on tubular member 60. Tubular member 60 is positioned in conduit 38 by simply dropping the unit into place. Piston washer 70 is positioned over the lower section of tubular member 60 and piston 72 is pressed into slot 67 with tapered wall 73 of piston 72 making a sliding, sealing, friction fit, against wall 41 of cup or second chamber 36. Auxiliary check valve 58 is mounted onto retaining ring 56 and will lie in a plane generally parallel to the bottom surface of plate 50. Plate 50 is dropped into outer rim 42 so that steps 51 and 53 of plate 50 nest into corresponding steps or ledges 46 and 47 of cup or chamber 34. Plate 50 is held in position preferably by suitable means such as ultrasonic welding, solvent glueing, or any other suitable adhesive means may be employed. When a plastic material is used for making housing 32, tubular member 60 and retainer 92 the plastic material should be substantially dimensionally stable to hot and cold water generally encountered for domestic use, have non-corrosive and high wear properties. O-rings 45 and 45' are spaced from each other and are mounted on the outside of the housing 32. O-ring 45 is held in place by lip or ledge 44 while O-ring 45' rests within circumferential groove 33. Diverter valve assembly 30 is ready for mounting in manifold 26 and is simply pressed into well 27 as shown in FIG. 1. The cartridge unit 12 is mounted on manifold 26 preferably by threading two bolts, not shown. The handle of the faucet is mounted in position and by manipulating the handle water will enter the cartridge through conduit 14 which directs the water into diverter valve 30 through openings 52 of plate 50. As shown in FIG. 3b diverter valve 30 is in the spout mode position so that water flows through spout end 18. Tubular member 60 is held in raised or spray mode position by the pressure exerted against piston 72 by the column of water in the spray conduit 22.

When spray head 20 which includes a hand operated valve, not shown, is manipulated, the pressure exerted against piston 72 is relieved so that the incoming water will force tubular member down to the spray mode position shown in FIG. 3a. In this position seal means or rim 90 is forced against tapered wall or seat 40 to form a liquid tight seal. Water is then forced through the elastomeric member 80 which forces the duck bill valve 84 open so that water passes through slit 88, through tubular member 60 and finally through the spray head assembly 20. When the valve of spray head 20 is closed the incoming water forces tubular member 60 to reciprocate in the other direction automatically due to the pressure differential on piston 72 created by the closing of the valve in spray head 20 thereby diverting water flow through the spout end 18. In this connection it should be noted that in FIGS. 3a and 3b the water paths are shown flowing in the direction of the arrows for either the the spout mode or spray mode position of the diverter valve 30. Since the path openings through which the water passes are relatively large, chances for fine or even coarse particles contained in potable water such as sand that would clog diverter valve 30 is substantially eliminated, thereby assuring an anticlogging valve which does not chatter. Blead hole 35 assures smooth movement of tubular member 60 by providing a path for any accumulated water that may pass into cup 36 above piston 72. When the tubular member 60 reciprocates from the spray mode to the spout mode position, water retained in cup 36 will be expelled through bleed holes 35. Water hammer generally associated with quick closing valves is obviated by maintaining a uniform flow rate through bleed hole 35 from cup 36. The tapered wall of upper section 62 of tubular member 60 meters water flow down uniformly until elastomeric member 80 seals against tapered wall 40. It should be noted that the extension or upper section 98 of flow retainer 92 assures that elastomeric member 80 remains mounted in position within tubular member 60 since retainer 92 cannot be removed from elastomeric member 80 without first removing top plate 50.

In some homes a portable dishwasher may have its inlet connected to spout end 18 of mixing valve 10 for its water supply. These dishwashers have an electrical solenoid valve controlling the incoming water. When this valve closes, water hammer pressures as high as 300 p.s.i. may travel back through fitting 10. The result is that after repeated hammers, the hose 22 may be subjected to pressures of up to 300 p.s.i. because duck bill 84 only lets water flow into hose 22 but not back through hose 22. These pressures are deleterious to the hose and will push element 80 out of member 60. However, the extension 98 of retainer 92 prevents element 80 from separating from tubular member 60 by pressing against knob 56 of plate 50. Also, the diameter of the recess 68 of tubular member 60 and the lip 64 are dimensioned such that when the pressure in hose 22 exceeds 120 to 150 p.s.i. it is relieved by the elastomeric material squeezing down to let the water out between lip 64 and recess 82 of elastomeric member 80.

Figure 3C:
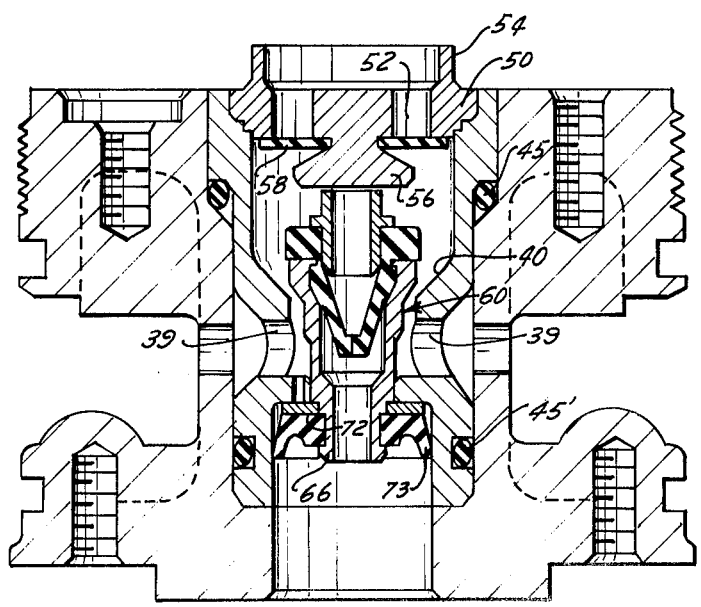

In FIG. 3c diverter valve assembly 30 is shown in the up or spout mode position. In the event that a reduced pressure should occur within cup or chamber 34 the column of water being sucked back through diverter valve 30 from conduit 22 would be blocked by duck bill valve 84. In the unlikely event that duck bill valve 84 should fail and remain open, auxiliary antisiphon valve 58 would be pressed against the under surface of plate 50 and thereby effectively stop the reverse water flow and break the siphon. If antisiphon valve 58 fails the air entering the spout will nullify or break the vacuum in chamber 34 as described above. It has been shown that no backflow occurs even if valve 84 is held open by a 1/32 inch diameter wire and valve 58 distorted by wires passing through holes 52.

What is claimed is:

1. A diverter valve assembly having a housing open at both ends and valve elements therein for mounting in fluid communication between a fluid inlet and a pair of outlet openings to conduct fluid through one outlet of the pair in a non-diverted mode and the other outlet of the pair in a diverted mode out of a diverter conduit, comprising:

a first cup-shaped tubular chamber, a second cut-shaped tubular chamber and an interconnecting conduit between said first and second chambers at the cup portions thereof forming said housing;

said interconnecting conduit having a smaller diameter than said first and second tubular chambers;

said conduit further having at least one port confined to the wall thereof for conducting fluid from said first chamber to said one outlet of said pair of openings in the non-diverted mode;

a tapered tubular member positioned in said interconnecting conduit and adapted to reciprocate in said conduit when said other outlet of said pair of outlets is opened and closed;

a sealing and backflow preventing valve means coupled to one end of said tapered tubular member and which is positioned at the cup portion of said first chamber to divert fluid through said tubular member by flowing the fluid through the opening in said valve means in only the diverted direction when said other outlet of said pair of outlets is opened and simultaneously sealing said valve means at the cup portion of said first chamber in the diverted mode;

piston means coupled to said tubular member at the end thereof opposite to the end coupled to said sealing and backflow preventing means; and said piston means being disposed in said second chamber below the port so that when said other outlet is opened, fluid entering said first chamber exerts a fluid pressure against said sealing and backflow preventing valve means to shift said tubular member from an open, non-diverted position to a sealing closed, diverted position in said first chamber whereby fluid flows through the tubular member in the diverted flow mode and out of the diverter conduit.

2. The diverter valve assembly of claim 1 wherein said sealing and backflow preventing valve means is made of a unitary construction and said valve means is inserted into said tapered tubular member.

3. The diverter valve assembly of claim 2 wherein said valve means is formed of elastomer and is frictionally fitted by insertion into said tapered tubular member to thereby be easily inserted and removed.

4. The diverter valve assembly of claim 3 including a separate tubular retaining means frictionally fitting into the elastomer sealing and backflow preventing valve means at the top thereof to maintain an open flowing passageway in said valve means thereby assuring free flow of fluid therethrough while further cushioning impact during reciprocations of said tapered tubular member.

5. The diverter valve assembly of claim 3 wherein the portion of said elastomeric valve means inserted into said tapered tubular member has converging elastomeric walls contacting each other to form a slit so that only fluid which passes through said first chamber will pass through the valve means.

6. The diverter valve assembly of claim 1 including a perforated circular plate for sealing the open end of said first chamber so that fluid enters said first chamber through the perforations of said plate.

7. The diverter valve assembly of claim 6 wherein a flexible disc-shaped check valve is mounted on the underside of said perforated plate and covers the openings in said plate to prevent backflow of fluid from said first chamber.

8. A mixing valve comprising:
a valve body adapted to be coupled to a fluid inlet source;
valve means coupled to said valve body and having actuating means for controlling fluid flow from said inlet source through said mixing valve; and
a diverter valve assembly having a housing open at both ends and valve elements therein and mounted in said valve body in fluid communication between said valve means and a pair of outlet openings to conduct fluid through one outlet of the pair in a non-diverted mode and the other outlet of the pair in a diverted mode out of a diverted conduit, said diverter valve assembly including:
a first cup-shaped tubular chamber, a second cup-shaped tubular chamber and an interconnecting conduit between said first and second chambers at the cup portions thereof forming said housing;
said interconnecting conduit having a smaller diameter than said first and second tubular chambers;
said conduit further having at least one port confined to the wall thereof for conducting fluid from said first chamber to said one outlet of said pair of openings in the non-diverted mode;
a tapered tubular member positioned in said interconnecting conduit and adapted to reciprocate in said conduit when said other outlet of said pair of outlets is opened and closed;
a sealing and backflow preventing valve means coupled to one end of said tapered tubular member and which is positioned at the cup portion of said first chamber to divert fluid through said tubular member by flowing the fluid through the opening in said valve means in only the diverted direction when said other outlet of said pair of outlets is opened and simultaneously sealing said valve means at the cup portion of said first chamber in the diverted mode;
piston means coupled to said tubular member at the end thereof opposite to the end coupled to said sealing and backflow preventing means; and said piston means being disposed in said second chamber below the port so that when said other outlet is opened, fluid entering said first chamber exerts a fluid pressure against said sealing and backflow preventing valve means to shift said tubular member from an open, non-directed position to a sealing closed diverted position in said first chamber whereby fluid flows through the tubular member in the diverted flow mode and out of the diverter conduit.

9. The mixing valve of claim 8 wherein said sealing and backflow preventing valve means is made of a unitary construction and said valve means is inserted into said tapered tubular member.

10. The mixing valve of claim 9 wherein said valve means is formed of elastomer and is frictionally fitted by insertion into said tapered tubular member to thereby be easily inserted and removed.

11. The mixing valve of claim 10 including a separate tubular retaining means frictionally fitting into the elastometer sealing and backflow preventing valve means at the top thereof to maintain an open flowing passageway in said valve means thereby assuring free flow of fluid therethrough while further cushioning impact during reciprocations of said tapered tubular member.

12. The mixing valve of claim 10 wherein the portion of said elastomeric valve means inserted into said tapered tubular member has converging elastomeric walls contacting each other to form a slit so that only fluid which passes through said first chamber will pass through the valve means.

13. The mixing valve of claim 8 including a perforated circular plate for sealing the open end of said first chamber so that fluid enters the first chamber through the perforations of said plate.

14. The mixing valve of claim 13 wherein a flexible disc-shaped check valve is mounted on the underside of said perforated plate and covers the openings in said plate to prevent backflow of fluid from said first chamber.

15. A diverter valve assembly having a housing open at both ends and valve elements therein for mounting in fluid communication between a fluid inlet and a pair of outlet openings to conduct fluid through one outlet of the pair in a non-diverted mode and the other outlet of the pair in a diverted mode out of a diverter conduit, comprising:
a first cup-shaped tubular chamber, a second cup-shaped tubular chamber and an interconnecting conduit between said first and second chambers at the cup portions thereof forming said housing;
said interconnecting conduit having a smaller diameter than said first and second tubular chambers;
said conduit further having at least one port confined to the wall thereof for conducting fluid from said first chamber to said one outlet of said pair of openings in the non-diverted mode;

a tapered tubular member positioned in said interconnecting conduit and adapted to reciprocate in said conduit when said other outlet of said pair of outlets is opened and closed;

a sealing and backflow preventing valve means coupled to one end of said tapered tubular member and which is positioned at the cup portion of said first chamber to divert fluid through said tubular member by flowing the fluid through the opening in said valve means in only the diverted direction when said other outlet of said pair of outlets is opened and simultaneously sealing said valve means at the cup portion of said first chamber in the diverted mode;

piston means coupled to said tubular member at the end thereof opposite to the end coupled to said sealing and backflow preventing means; and said piston means being disposed in said second chamber below the port so that when said other outlet is opened, fluid entering said first chamber exerts a fluid pressure against said sealing and backflow preventing valve means to shift said tubular member from an open, non-diverted position to a sealing closed, diverted position in said first chamber whereby fluid flows through the tubular member in the diverted flow mode and out of the diverter conduit; and a circular perforated plate mounted on said housing and sealing the open end of said first chamber.

16. A mixing valve comprising:

a valve body adapted to be coupled to a fluid inlet source;

valve means coupled to said valve body and having actuating means for controlling fluid flow from said inlet source through said mixing valve; and a diverter valve assembly having a housing open at both ends and valve elements therein and mounted in said valve body in fluid communication between said valve means and a pair of outlet openings to conduct fluid through one outlet of the pair in a non-diverted mode and the other outlet of the pair in a diverted mode out of a diverter conduit, said diverter valve assembly including:

a first cup-shaped tubular chamber, a second cup-shaped tubular chamber and an interconnecting conduit between said first and second chambers at the cup portions thereof forming said housing;

said interconnecting conduit having a smaller diameter than said first and second tubular chambers;

said conduit further having at least one port confined to the wall thereof for conducting fluid from said first chamber to said one outlet of said pair of openings in the non-diverted mode;

a tapered tubular member positioned in said interconnecting conduit and adapted to reciprocate in said conduit when said other outlet of said pair of outlets is opened and closed;

a sealing and backflow preventing valve means coupled to one end of said tapered tubular member and which is positioned at the cup portion of said first chamber to divert fluid through said tubular member by flowing the fluid through the opening in said valve means in only the diverted direction when said other outlet of said pair of outlets is opened and simultaneously sealing said valve means at the cup portion of said first chamber in the diverted mode;

piston means coupled to said tubular member at the end thereof opposite to the end coupled to said sealing and backflow preventing means; and said piston means being disposed in said second chamber below the port so that when said other outlet is opened, fluid entering said first chamber exerts a fluid pressure against said sealing and backflow preventing valve means to shift said tubular member from an open, non-directed position to a sealing closed diverted position in said first chamber whereby fluid flows through the tubular member in the diverted flow mode and out of the diverter conduit; and a circular perforated plate mounted on said housing and sealing the open end of said first chamber.

* * * * *